United States Patent
Walker et al.

(10) Patent No.: US 12,299,930 B2
(45) Date of Patent: May 13, 2025

(54) REAL-TIME BODY POSE ESTIMATION SYSTEM AND METHOD IN UNCONSTRAINED VIDEO

(71) Applicant: Image Metrics, Ltd., Manchester (GB)

(72) Inventors: Kevin Walker, Sheffield (GB); Mike Rogers, Austin, TX (US); Chris Bowles, Sheffield (GB); Matthew Oakes, Manchester (GB); Mike Taylor, Cheshire (GB); Vincent Drouard, Manchester (GB)

(73) Assignee: Image Metrics, Ltd., Manchester (GB)

( * ) Notice: Subject to any disclaimer, the term of this patent is extended or adjusted under 35 U.S.C. 154(b) by 442 days.

(21) Appl. No.: 17/836,572

(22) Filed: Jun. 9, 2022

(65) Prior Publication Data
US 2023/0145048 A1 May 11, 2023

Related U.S. Application Data

(60) Provisional application No. 63/276,273, filed on Nov. 5, 2021.

(51) Int. Cl.
*G06T 7/00* (2017.01)
*G06T 7/73* (2017.01)
*G06V 40/20* (2022.01)

(52) U.S. Cl.
CPC ............... *G06T 7/75* (2017.01); *G06V 40/23* (2022.01); *G06T 2207/20081* (2013.01); *G06T 2207/20084* (2013.01)

(58) Field of Classification Search
CPC . G06T 2207/20084; G06T 2207/30196; G06T 2207/20081; G06T 7/73;
(Continued)

(56) References Cited

U.S. PATENT DOCUMENTS 10,853,970 B1 * 12/2020 Akbas ................... G06T 1/0007
11,074,711 B1 * 7/2021 Akbas .................. G06V 10/454
(Continued)

OTHER PUBLICATIONS

Chen, Ching-Hang, and Deva Ramanan. "3d human pose estimation= 2d pose estimation+ matching." Proceedings of the IEEE conference on computer vision and pattern recognition. 2017.*
(Continued)

*Primary Examiner* — Li Liu
(74) *Attorney, Agent, or Firm* — Leason Ellis LLP

(57) ABSTRACT

In one or more implementations, body features of a subject can be tracked and a pose estimation produced using an unconstrained video sequence. The video sequence constitutes a physical record of the body features of the subject. A set of 2D coordinates corresponding to the body features of the subject can be received from a first neural network and 2D Keypoints are detected and transmitted to a second neural network. The second neural network can return corresponding depth estimation values, which can be processed to generate a set of 3D coordinates that correspond to the body features of the subject in camera space. Furthermore, one or more non-linear optimizations can be applied to fit a predetermined skeleton to the generate 3D Keypoints, and produce the pose estimation corresponding to the body features of the subject.

20 Claims, 19 Drawing Sheets
(15 of 19 Drawing Sheet(s) Filed in Color)

(58) Field of Classification Search
CPC .................. G06T 2200/04; G06T 7/75; G06T 2207/10016; G06T 7/251; G06T 7/70; G06V 10/82; G06V 40/23; G06N 3/045; G06N 3/02; G06N 3/08
See application file for complete search history.

(56) References Cited

U.S. PATENT DOCUMENTS

| | | | | |
|---|---|---|---|---|
| 2019/0278983 | A1* | 9/2019 | Iqbal | G06N 3/084 |
| 2020/0272888 | A1* | 8/2020 | Wang | G06V 40/103 |
| 2021/0081689 | A1* | 3/2021 | Weyers | G06N 3/02 |
| 2021/0097718 | A1* | 4/2021 | Fisch | G06V 40/23 |
| 2022/0066544 | A1* | 3/2022 | Kwon | G06V 40/23 |
| 2022/0351405 | A1* | 11/2022 | Zhou | G06F 3/01 |
| 2024/0135581 | A1* | 4/2024 | Gonzalez Garcia | G06T 13/00 |

OTHER PUBLICATIONS

Mehta, Dushyant, et al. "Vnect: Real-time 3d human pose estimation with a single rgb camera." Acm transactions on graphics (tog) 36.4 (2017): 1-14.*

Wang, Jinbao, et al. "Deep 3D human pose estimation: A review." Computer Vision and Image Understanding 210 (2021): 103225.*

Zhe Cao et al., "Realtime Multi-Person 2D Pose Estimation using Part Affinity Fields", InProceedings of the IEEE conference on computer vision and pattern recognition, Apr. 2017.

Julieta Martinez et al., "A simple yet effective baseline for 3d human pose estimation", InProceedings of the IEEE international conference on computer vision, Aug. 2017.

Tomas Pfister et al., "Flowing ConvNets for Human Pose Estimation in Videos", InProceedings of the IEEE international conference on computer vision, Nov. 2015.

Mark Sandler et al., "MobileNetV2: Inverted Residuals and Linear Bottlenecks", InProceedings of the IEEE conference on computer vision and pattern recognition, Mar. 2019.

Shih-En Wei et al., "Convolutional Pose Machines", InProceedings of the IEEE conference on Computer Vision and Pattern Recognition, Apr. 2016.

Marine Le Morvan et al., "NeuMiss networks: differentiable programming for supervised learning with missing values", Advances in Neural Information Processing Systems, Nov. 2020.

Paul Viola et al., "Rapid Object Detection using a Boosted Cascade of Simple Features", InProceedings of the 2001 IEEE computer society conference on computer vision and pattern recognition, Dec. 2001.

* cited by examiner

Fig. 5
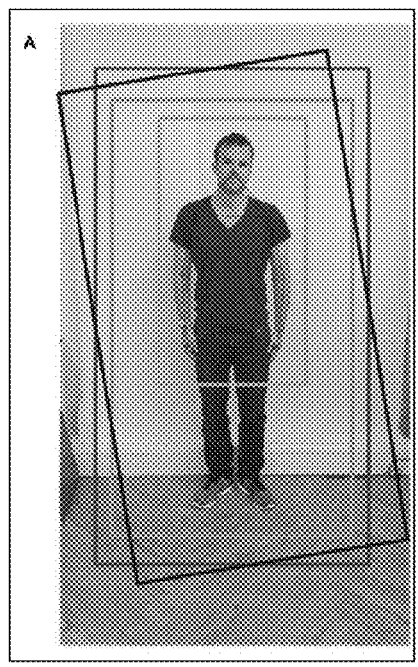
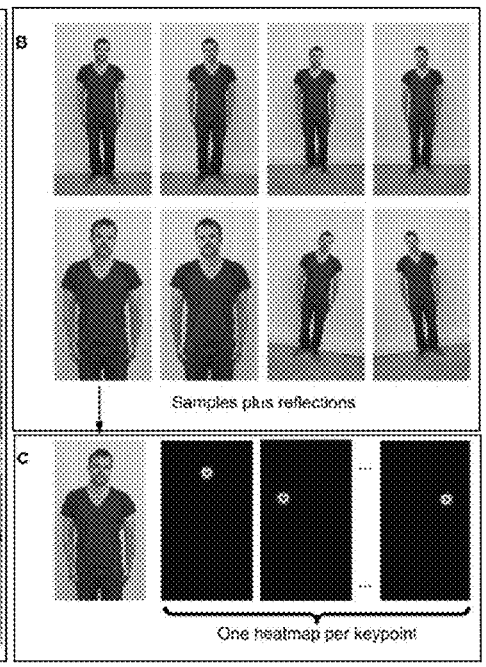
Fig. 5A
Fig. 5B
Fig. 5C

REAL-TIME BODY POSE ESTIMATION SYSTEM AND METHOD IN UNCONSTRAINED VIDEO

CROSS-REFERENCE TO RELATED APPLICATIONS

The present application claims the benefit of U.S. Provisional Appl. No. 63/276,273, filed Nov. 5, 2021, entitled "REAL-TIME BODY POSE ESTIMATION SYSTEM AND METHOD IN UNCONSTRAINED VIDEO," which is incorporated herein by reference in its entirety.

FIELD

The present disclosure relates, generally, to body feature tracking and pose estimation and, more particularly, to real-time tracking and pose estimation of body features in unconstrained video sequences.

BACKGROUND

The estimation of body poses and localization of body features within unconstrained video sequences is an important precursor to a range of applications. For example, such estimation is useful for the production of augmented reality effects in social media, for character animations for both social and professional use cases, and body motion capture for gait analysis for both sports and medical fields. As used herein, the term, "body feature" refers, generally, to an identifiable, semantically unique landmark on a human body, such as the location of the left wrist joint above the hand, the tip of the nose, or the centre of the knee joint of the right knee. Further, a "body pose" refers, generally, to a set of relationships between the locations and orientations of each body feature in a 3D space.

Applications, such as those identified above, require efficient and robust provisioning of body feature locations along with accurate and realistic body pose estimation in real-time on a variety of hardware-limited consumer and professional devices in order to achieve satisfactory performance and a good user experience, the potential applications referenced. Conventional methods may not be computationally efficient enough to be applied to real-time video localization and estimation, or deployed to hardware-limited, consumer-level mobile devices. Further, conventional methods may not provide a complete 3D body pose estimate, which can limit their utility in particular use-cases.

For example, a multistage architecture has been proposed to estimate the 2D position of body features within an image. Although this technique works well, it is restricted to provide only 2D positional information within an image frame, thereby restricting any applications based on this approach to two dimensional augmentations and animations. Unfortunately, augmented reality applications that aim to create realistic effects require 3D information detailing an exact body pose, as well as gait analysis use cases, would be very limited if only a 2D projection of the actual 3D body pose was captured, thereby lessening what could be understood from the analysis.

Another example teaches a method for predicting depth information of body features from 2D projections in an image frame. Although an important step towards recovering the full 3D body pose, this method provides only a 3D point cloud and recovers no rotational information about each body part. Understanding how body joints are oriented helps to more fully understand how a body is posed. Digital characters include a surface representation (or a mesh) and a hierarchical set of joints known as a skeleton. To animate such a digital character from a tracked body pose, skeleton joints must be positioned and/or rotated.

Some online platforms have seen an increase in the number of posted videos that display full or partial body poses. Often such videos depict users who are dancing or performing some other activity. It is recognized by the inventors that approximately half of these videos contain frames where body features, most commonly feet and knees, are out of frame. This prevents conventional body tracking methods from providing a complete estimation of full body pose in frames, due to body parts being located outside the frame or otherwise occluded within the current image frame. This can restrict the consumer's performance, such that they must stay completely within the image frame, or can severely limit the potential quality of user experience where a complete estimation of body pose is important on all frames, such as character animation or full body augmented reality effects.

There is further a need for efficient localization in unconstrained environments for applications such as those highlighted to be made far more accessible to a much broader range of potential end-users and user scenarios. Social, professional and medical scenarios where the user can act, dance or otherwise perform an activity in an unrestricted way cannot be addressed successfully if the tracking and pose estimation system cannot achieve satisfactory performance on truly unconstrained video, including various lighting conditions and extreme poses.

BRIEF SUMMARY

In one or more implementations, the present disclosure includes a computer-implemented system and method for tracking body features of a subject and producing a pose estimation using an unconstrained video sequence at computational speeds approximating real time. The video sequence constitutes a physical record of the body features of the subject. Further, at least one computing device can receive, from a first neural network, a set of 2D coordinates corresponding to the body features of the subject. The first neural network can be trained to use an entire image or image region as input and to return a respective set of 2D coordinates. Further, the at least one computing device can detect, using the received set of 2D coordinates, 2D Keypoints corresponding to the body features of the subject and transmit the detected 2D Keypoints to a second neural network. The second neural network can be trained to use the detected 2D Keypoints as input and to return corresponding depth estimation values. Moreover, the at least one computing device can receive from the second neural network the depth estimation values corresponding to the transmitted 2D Keypoints. The at least one computing device can process the received depth estimation values to generate a set of 3D coordinates that correspond to the body features of the subject in camera space. Furthermore, the at least one computing device can apply one or more non-linear optimizations to fit a predetermined skeleton to the generate 3D Keypoints, and produce the pose estimation corresponding to the body features of the subject.

In one or more implementations, the 2D Keypoints are missing data, and the at least one computing device receives, from the second neural network in response to the transmitted detected 2D Keypoints, a completed set of 2D Keypoints.

In one or more implementations, the first or second neural network is trained with images augmented with different backgrounds.

In one or more implementations, wherein the first or second neural network is trained with images augmented with motion blur.

In one or more implementations, the first or second neural network uses scale-independent images produced from integral images for training and inference.

In one or more implementations, the at least one computing device utilizes an image-region obtained from a bounding box enclosing the 2D Keypoints detected in a previous frame in the detecting process.

In one or more implementations, the at least one computing device normalizes the detected 2D Keypoints prior to transmitting the detected 2D Keypoints to the first neural network.

In one or more implementations, the at least one computing device normalizes the received depth estimation values prior to generating the 3D coordinates.

In one or more implementations, the first neural network is a convolutional neural network.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings.

FIG. 5 illustrates Keypoint Detector 211 training data generation, in accordance with embodiments of the present disclosure.

FIG. 5A shows a typical image with an unchanged (green), scaled (red), rotated (blue) and half-body (orange) bounding box, in accordance with embodiments of the present disclosure.

FIG. 5B shows the image samples these bounding boxes yield as well as their reflections, in accordance with embodiments of the present disclosure.

FIG. 5C shows exemplar heatmaps generated from one of these samples, in accordance with embodiments of the present disclosure.

FIG. 19A depicts a visualisation of a regular grid of sampling points in an original image, FIG. 19B shows a sampling grid which is misaligned with the original image pixel samples. The red crosses depict sampling centers and the red boxes represent the desired scale of the sampled pixels, the black dots show the image pixel centers and the black boxes the scale of the image pixels and FIG. 19C depicts the image patch generated by applying scale-independent integral image sampling at given sampling points.

DETAILED DESCRIPTION

Figure 1:
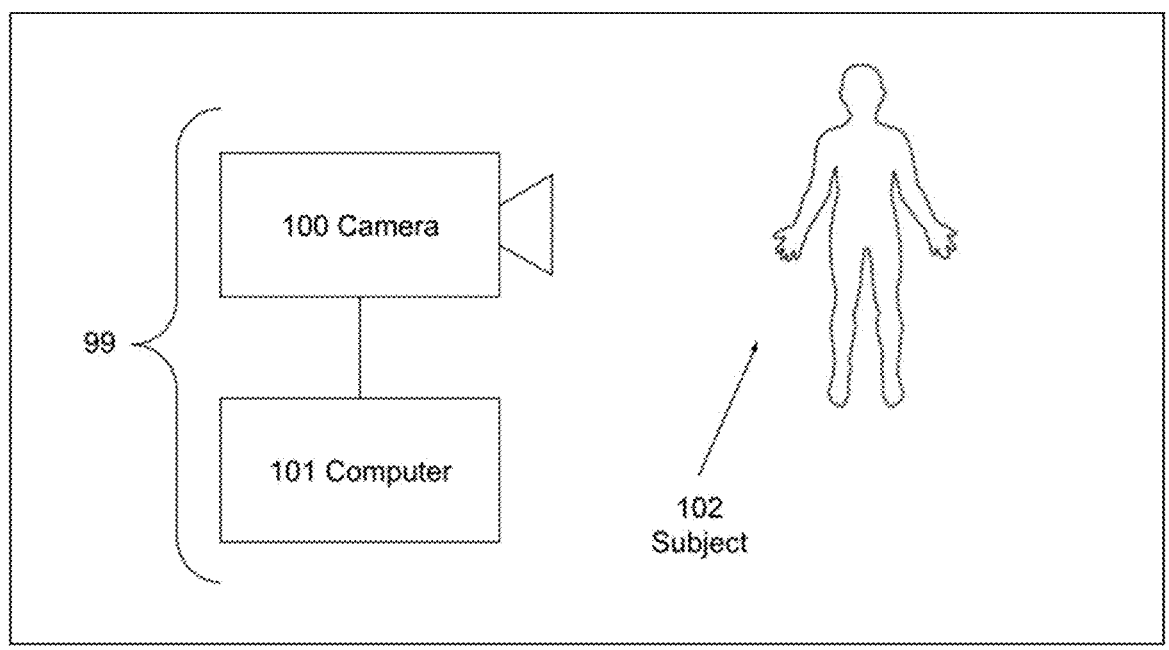
FIG. 1 schematically depicts the basic components of a body pose estimation system, in accordance with embodiments of the present disclosure.

Definitions. As used in this description and the accompanying claims, the following terms shall have the meanings indicated, unless the context otherwise requires:

A "set" includes at least one member.

The term "image" refers to any multidimensional representation, whether in tangible or otherwise perceptible form or otherwise, of an object, whereby a value of some characteristic is associated with each of a plurality of locations corresponding to dimensional coordinates of the object in physical space, though not necessarily mapped one-to-one thereonto. Thus, for example, the graphic display of the spatial distribution of some feature, such as temperature, in one or more colors constitutes an image. So, also, does an array of numbers, in a computer memory or holographic medium, corresponding to dimensional coordinates of the object.

Similarly, "imaging" refers to the rendering of a stated physical characteristic in terms of one or more images.

A "computer process" refers, generally, to the performance of a described function in a computer using computer hardware (such as a processor, field-programmable gate array or other electronic combinatorial logic, or similar device), which can be operating under control of software or firmware or a combination of any of these or operating outside control of any of the foregoing. All or part of the described function can be performed by active or passive electronic components, such as transistors or resistors. The term "computer process" does not necessarily require a schedulable entity, or operation of a computer program or a part thereof, although, in some embodiments, a computer process can be implemented by such a schedulable entity, or operation of a computer program or a part thereof. Furthermore, unless the context otherwise requires, a "process" can be implemented using more than one processor or more than one (single- or multi-processor) computer.

An "animal subject" refers, generally, to a particular instance of a vertebrate selected from the group consisting of humans, non-human mammals, birds, reptiles, and amphibians.

An "unconstrained" video sequence that constitutes a physical record of the face of an animal subject refers, generally, to a sequence having no constraints on environment, lighting, body pose of the subject, nor on characteristics of the camera giving rise to the sequence.

A "2D keypoint" refers, generally, to the location of a body feature in an image.

A "3D keypoint" refers, generally, to the location of a body feature in an image with associated normalized depth value.

A "confidence" refers, generally, to a single value between 0 and 1 where 1 represents high confidence, and 0 low confidence.

A "heatmap" refers, generally, to a representation of a keypoint in an image as a high valued gaussian peak centered at the keypoint location in an otherwise low-valued image.

A "joint" refers, generally, to a 3D representation of an object in a 3D space with position, orientation and length which often represents a physical limb in the body of an individual.

A "skeleton" refers, generally, to a 3D representation of a body pose and consists of a hierarchical set of connected "joints". The body pose is described by the position and orientation of each joint in the hierarchy along with the lengths of each joint. The terms "skeleton", "joint", "joint orient", "parent transform", "limb length" and associated terminology are well known to practitioners with ordinary skill in the art of character rigging.

A "model" refers, generally, to a set of parameters associated with each of a set of hierarchically ordered operations that when applied to input data will produce output values useful in identifying body feature locations or body pose estimations. The embodiments of the present disclosure include but are not limited to models known as convolutional neural networks and all other types of neural network architecture. The embodiments of the present disclosure include but are not limited to models containing linear, non-linear, normalisation, convolutional, and other input to output transformation operations. The parameters of models of this type are typically refined to produce useful outputs using large bodies of annotated exemplar data. The process of refining model parameters is well known to practitioners of ordinary skill in the field.

FIG. 1 schematically depicts basic components of a body pose estimation system 99, in accordance with one or more embodiments of the present disclosure. A monocular video camera 100 can be positioned to capture the subject 102 during a performance, and a computational device 101 contains a central processing unit and memory. The memory can be capable of storing all of the entities and data of the system. The memory also can contain a program in the form of a series of instructions which, when executed by the central processing unit and applied to the data and entities, can estimate the body pose of the subject in the images captured by the camera. The system 99 can be configured so that the video of the performance of the subject 102 can be captured by the camera 100 and streamed to the computational device 101 for processing and generation of body pose estimations in real-time.

Real-Time Body Pose Estimation in Unconstrained Video

One or more embodiments of the present disclosure can be represented as two distinct phases: an offline training phase where models of human appearance and pose are created using large sets of annotated training data without computational restrictions, and a runtime phase where body feature locations and pose estimations are produced in real-time on hardware-constrained consumer devices using only the constructed models and the captured images as input.

Figure 2:
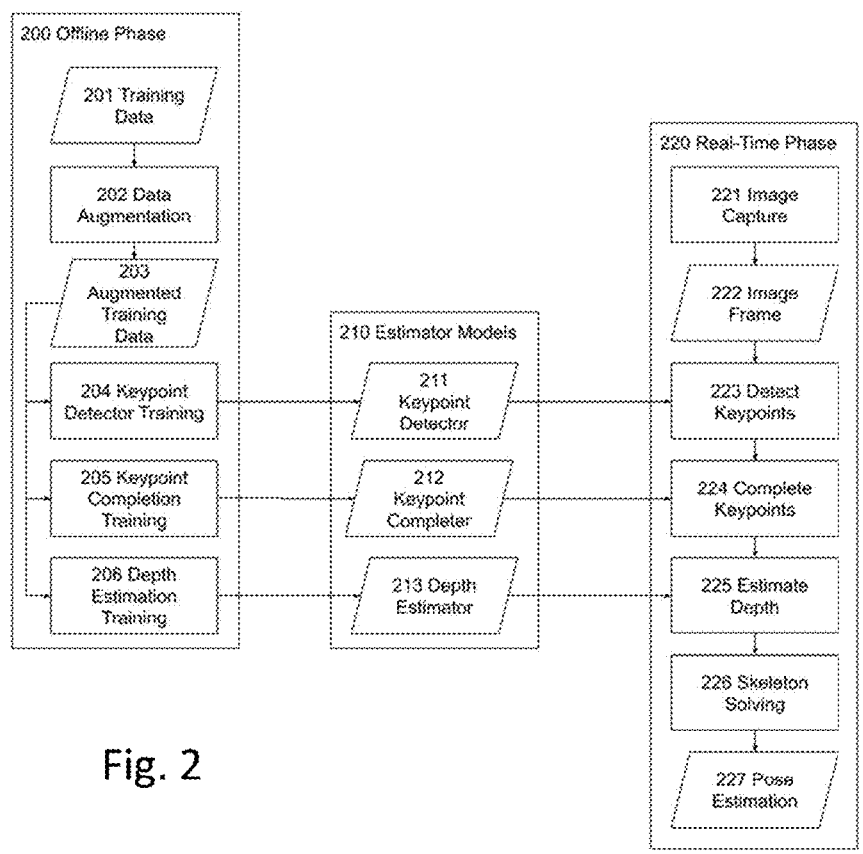
FIG. 2 is a flowchart depicting an overview of the offline and real-time phases of the system, in accordance with embodiments of the present disclosure.

FIG. 2 is a flowchart depicting an example overview of the Offline Phase 200 and Real-Time Phase 220 of the system 99, in accordance with one or more embodiments of the present disclosure. Methods for generating body pose estimations from unconstrained image sequences depicting the performance of the subject 102 of FIG. 1, as captured by a camera 100 of FIG. 1, are now described with reference to the flowchart depicted in FIG. 2. The Offline Phase 200 involves the training and construction of Estimator Models 210, including via the use of Training Data 201 and/or Augmented Training Data 203. The Real-Time Phase 220 uses the Estimator Models 210 to generate the Pose Estimation 227. The Offline Phase 200 can be executed prior to the Real-Time Phase 220 but need not be executed on the same computational unit, since its generated output, the Estimator Models 210, can be stored on digital memory and transferred to other computational units. Once constructed, the Estimator Models 210 can be used for any number of Real-Time Phase 220 executions.

The Offline Phase 200, which is described in detail below, can include a Data Augmentation process 202 as well as Keypoint Detector Training 204, Keypoint Completion Training 205 and Depth Predictor Training 206, the products of which include, respectively, the Keypoint Detector 211, Keypoint Completer 212 and Depth Estimator 213 components of the Estimator Models 210. Each training process 204-206 requires its own corresponding data source which can be provided by the Data Augmentation 202.

Figure 3:
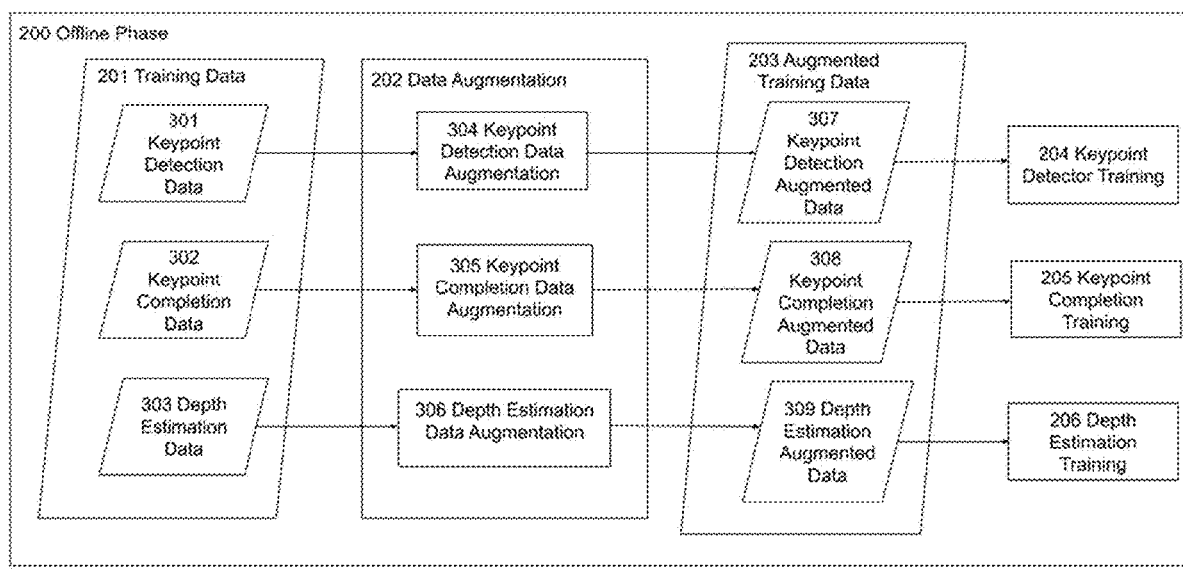
FIG. 3 is a flowchart depicting an overview of the offline phase of the system, in accordance with embodiments of the present disclosure.

FIG. 3. shows the Data Augmentation 202 process in more detail. Keypoint Detection Data 301, Keypoint Completion Data 302 and Depth Estimation Data 303 are used as input to the data augmentation processes, Keypoint Detection Data Augmentation 304, Keypoint Completion Data Augmentation 305 and Depth Estimation Data Augmentation 306 which produce augmented data for each training process. These data and processes are described in detail in the sections below.

Figure 4:
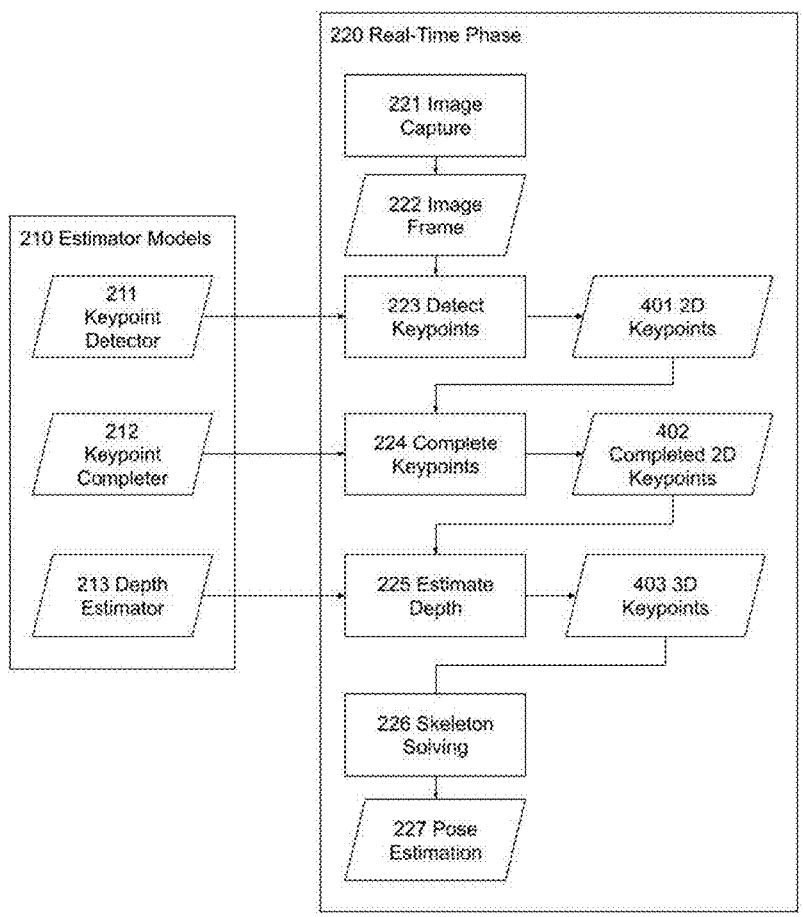
FIG. 4 is a flowchart depicting an overview of the real-time phase of processing including various data objects used in the system, in accordance with embodiments of the present disclosure.

FIG. 4 shows a more detailed view of the Real-Time Phase 220. The Detect Keypoint process 223 produces a set of 2D Keypoints 401 for each Image Frame 222 provided from a captured video sequence using the Keypoint Detector 211. Not all keypoints are required to have a valid prediction after this process. The possibly incomplete 2D Keypoint locations are passed to the Complete Keypoints process 224 which creates entries for any missing keypoints using the Keypoint Completer 212 to produce Completed 2D Keypoints 402. The Completed 2D Keypoints are then passed to the Estimate Depth process 225 which produces a depth for each keypoint using the Depth Estimator 213 and adds that depth to each keypoint, resulting in a set of 3D Keypoints 403. Finally, the 3D Keypoints are passed to the Skeleton Solving process 226, which results in a Pose Estimation 227 represented as parameters for the joints of a predefined skeleton.

Pose Estimations 227 that have been created from sequential video frames can be further processed in real-time, for applications such as digital character animation and augmented reality effects.

Offline Phase: Keypoint Training

A goal of the Keypoint Detector 211 model can be to produce a set of body feature locations and confidences given an unconstrained input image. To achieve this, the model can be trained with many images which have been annotated with a set of body feature locations. The set of images can be chosen to cover as many capture scenarios as possible. As shown in FIG. 2 and FIG. 3, the Keypoint Detector 211 consists of a model trained in Keypoint Detector Training 204 using Keypoint Detection Data 301. Keypoint Detection Data 301 consists of many images containing one or more manually annotated keypoints corresponding to body features. One such image with body feature annotation is shown in FIG. 5A. A bounding box enclosing the keypoint locations can be computed for each image and Keypoint Detection Data Augmentation 304 can be performed by applying small random scales and rotations to this box (see FIG. 5A). Other augmentations embodied by the present disclosure include but are not limited to horizontal flipping, color balancing and cropping around the upper body. Training data augmentations like these are well known to a person of ordinary skill in the art. An image patch with dimensions matching the model's requirements and encompassing the keypoint locations can be sampled from each training image (see FIG. 5B) as described in the Real-Time and Offline Phases: Image Sampling section, below. A set of heatmaps each containing a Gaussian peak corresponding to a keypoint location can be also generated for each sample (FIG. 5C) with keypoints falling outside the bounding box represented by an empty heatmap. These pairs of image sample and sets of heatmaps form the Keypoint Detection Augmented Data 307 and are subsequently used to train Keypoint Detector 211.

The Keypoint Detector 211 model contains MobileNetV2 backbone followed by five convolutional pose machine stages with fast inverted residual blocks replacing convolutions. Further optimizations have been made to the MobileNetV2 backbone to provide faster inference including reducing the input resolution to 192×192 and the number of output channels in layers. Mean squared error losses can be computed at the end of each CPM stage by comparing network output with the generated heatmaps, which can be represented substantially in realtime. This approach and architecture are well known to a person of ordinary skill in the art, furthermore, many other network architectures could be used and are within the scope of this disclosure. The systems and methods of performing such a training process are well known to a person of ordinary skill in the art.

Offline Phase: Keypoint Completion Training

An aim of the Keypoint Completer 212 model can be to produce a body feature location for each feature in a complete set of body features that have been determined in advance, including when given an incomplete subset of those body features. Keypoint Completion Training 205 can include a process by which a Keypoint Completer 212 is created. Keypoint Completion Data Augmentation 305 can also convert Keypoint Completion Data 302 into Keypoint Completion Augmented Data 308, as shown in FIG. 3.

For each image, the Keypoint Detector 211 can produce a set of 2D Keypoints 401, one for each body feature. Each body feature can have a 2D keypoint position and an assigned confidence value. On a given frame, a possibly empty subset of the 2D Keypoints may either fail to have a predicted location or be erroneously predicted in an implausible location with low confidence. This subset can be identified as having confidence values below a threshold, referred to herein, generally as a subset of missing body features. Missing features may not be reliable for use in predicting body pose, although plausible locations can be determined from the subset of the known points to improve overall pose estimation. A method that can be employed for the derivation of a complete set of body feature locations from a subset, in accordance with one or more embodiments of the present disclosure, is encapsulated by the Complete Keypoints 224 process.

The training data for the Keypoint Completer 211 are useful to provide pairs of plausible body feature sets with missing features along and the associated completed set of body features. With reference to FIG. 3., these data are produced by applying the Keypoint Completion Data Augmentation 305 to Keypoint Completion Data 302. Keypoint Completion Data 302 can include many examples of plausible 3D body poses represented as skeletons having no missing features. Keypoint Completion Augmented Data 308 can include a set of normalized incomplete 2D Keypoints, a vector specifying the which of the body features is missing, and a complete set of normalized 2D features.

Keypoint Completion Data Augmentation 305 can selectively mark a random, variable proportion of joints from each example as missing and store this in a vector. The random occlusion pattern vectors are modelled based upon occlusion statistics for each body feature in representative, annotated video sequences. The input 2D body features can be created by projecting the example body pose from 3D to 2D using a camera model, and normalising which is described below. The target 2D body features are created by completing the missing joints with a variety of methods, then projecting and normalising the completed body pose. In this way, pairs of 2D body features with tuneable proportions and patterns of missing data and target pose characteristics can be produced.

The specific configuration of missing joint completion in the Keypoint Completion Data Augmentation 305 process depends on the desired characteristics of the completed body feature set. One or more embodiments of the present disclosure is to complete the missing data with the original locations of the source data set. Moreover, the present disclosure includes completing the missing joints by resetting their transform properties to a neutral pose and using their resulting projected location to complete the 2D body feature set. The process of setting joint transforms to their neutral pose is known person of ordinary skill in the art. Different embodiments of missing point completion are possible and are included under the scope of the present disclosure.

Figure 6:
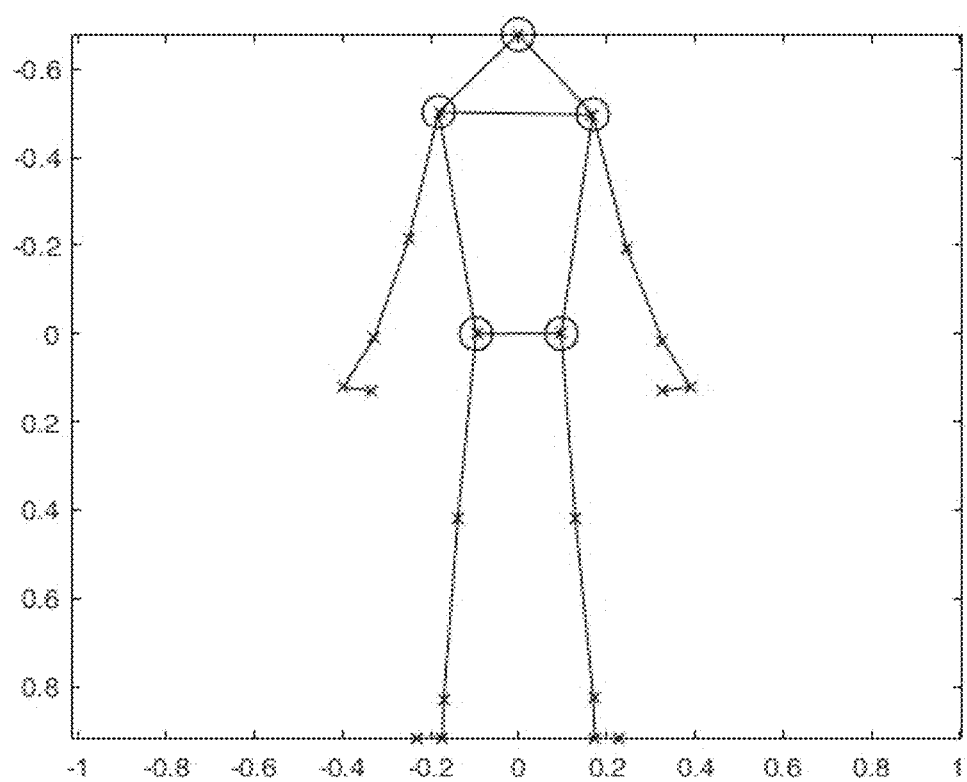
FIG. 6 illustrates a 2D reference skeleton based upon the average human limb proportions, in accordance with embodiments of the present disclosure.

The 2D body features in the Keypoint Completion Augmented Data 308 are normalized to improve model performance. A subset of body features is chosen to act as normalisation reference locations. One preferred embodiment of the present disclosure is to choose the body features associated with the hips, shoulders, and head of an individual, as illustrated in FIG. 6. by the black circles. If any of the reference body features are missing, they can be calculated by aligning the known body features to fixed reference set of body features as illustrated in FIG. 6 by the blue 'x's and lines, using an affine transform. The missing features are completed with the fixed body features and aligned back to the original shape using the inverse transform.

The normalization of body features, B, is shown below:

$$B_{normalized} = (B - B_{offset}) * mPP \quad \text{Equation 1}$$

Firstly, an offset, $B_{offset}$, is applied to the features to align the mid-point of the left and right hip features to the origin. The consequent offset body features are scaled by the metres per pixel, mPP, to obtain the normalized body features, $B_{normalized}$.

Figures 7A, 7B:
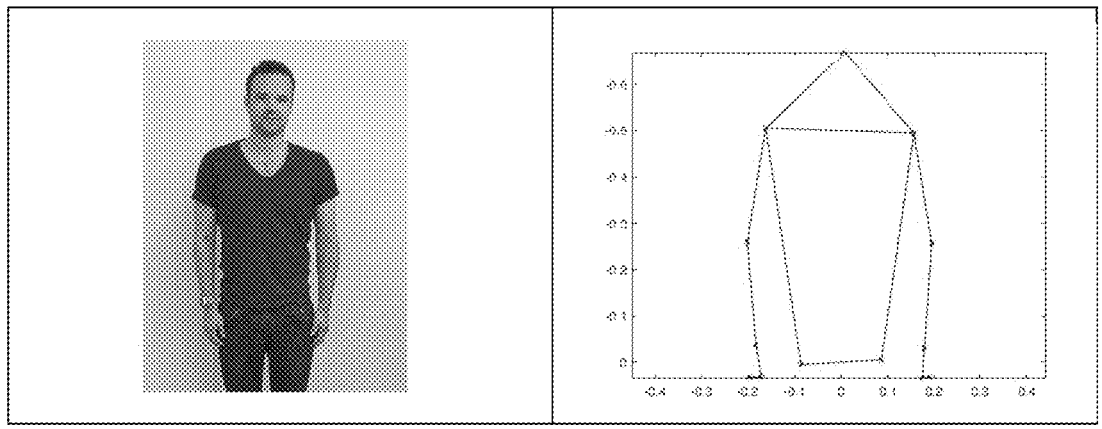
FIGS. 7A and 7B show the 2D keypoints before and after, respectively, the normalisation process, in accordance with embodiments of the present disclosure.
Figure 8:
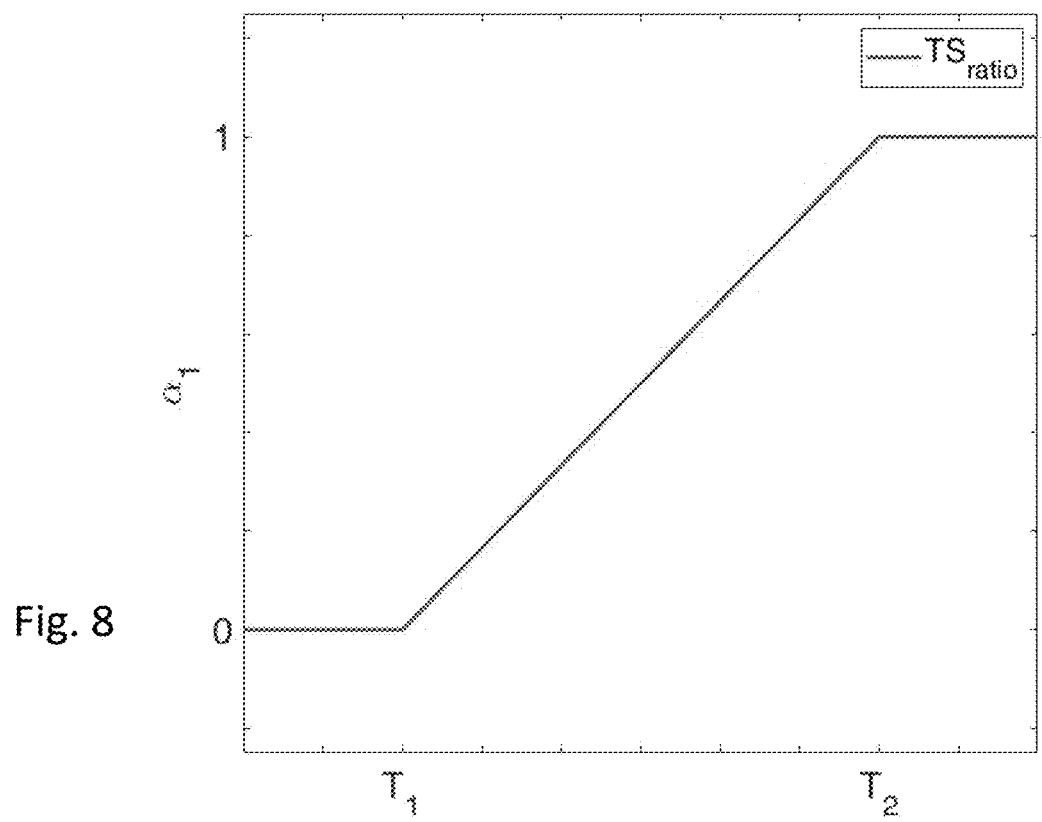
FIG. 8. depicts how $\alpha 1$ is chosen in the normalisation process, in accordance with embodiments of the present disclosure.

Equation 2 shows how mPP is derived by a weighted combination of the meters per pixel for the shoulder, mPPshoulder, and the meters per pixel for the torso, mPPtorso. The scale weights α1 and α2 are linked by $α_2 = 1 - α_1$. mPPtorso is calculated by dividing the mean human torso length, measured in meters, by the torso length in the image, measured in pixels. The torso length is illustrated in FIG. 7A by the vertical red line. mPPshoulder is calculated by dividing the mean human shoulder width by the shoulder width in the image. The shoulder width is highlighted in FIG. 7A. by the horizontal red line. α1 is dependent upon the ratio between the torso length and shoulder width in the image, TSratio. FIG. 8. depicts calculating α1. If TSratio falls below threshold T1 or above threshold T2, α1 is assigned a value of 0 or 1, respectively. A linearly interpolated value is calculated for T1<TSratio<T2. FIG. 7B shows the 2D image points in FIG. 7A after the normalization process.

$$mPP = (α_1 * mPP_{Torso}) + (α_2 * mPP_{Shoulder}) \quad \text{Equation 2}$$

Figure 9:
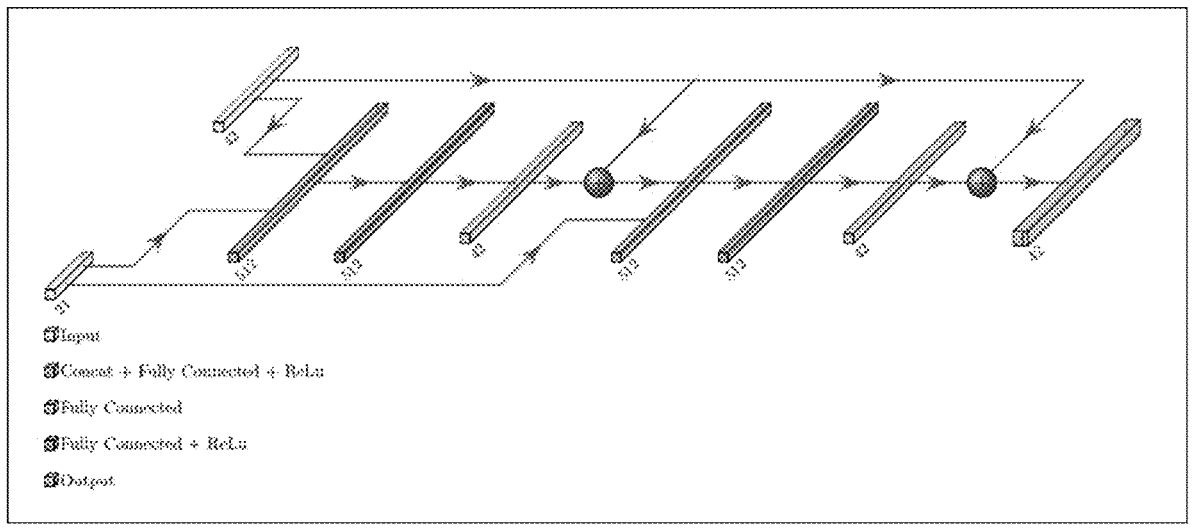
FIG. 9 shows the keypoint completion network architecture, in accordance with embodiments of the present disclosure.

A preferred embodiment of the Keypoint Completer 212 model is a neural network with an architecture shown in FIG. 9, although other architectures and models are possible and are included in the scope of the present disclosure. The preferred embodiment has been designed to be as light-weight as possible whilst giving appropriate prediction accuracy. The network has a residual block-based structure, where there is a direct path between the keypoint inputs and outputs, so the points that don't require completing will be modified as sparsely as possible, minimizing unnecessary computation. The vector describing the missing features has elements set of 1 corresponding to missing features, and 0 for measured features. Missing body features have coordinates set to 0 and the feature set is flattened from a 2D to 1D vector before input. The model is then trained with the processed Keypoint Completion Augmented Data 308 by the Keypoint Completion Training 205 process. The systems and methods of performing such a training process are well known to a person of ordinary skill.

Offline Phase: Depth Estimation Training

The aim of the Depth Estimator 213 model is to take a completed set of 2D body features and produce an estimate of the depth of each feature in 3D camera space. In this section, Depth Estimation Training 206 is presented, by which a Depth Estimator 213 is created. Depth Estimation Data Augmentation 306 is also discussed, which converts Depth Estimation Data 303 into Depth Estimation Augmented Data 309, as shown in FIG. 3.

Figure 10:
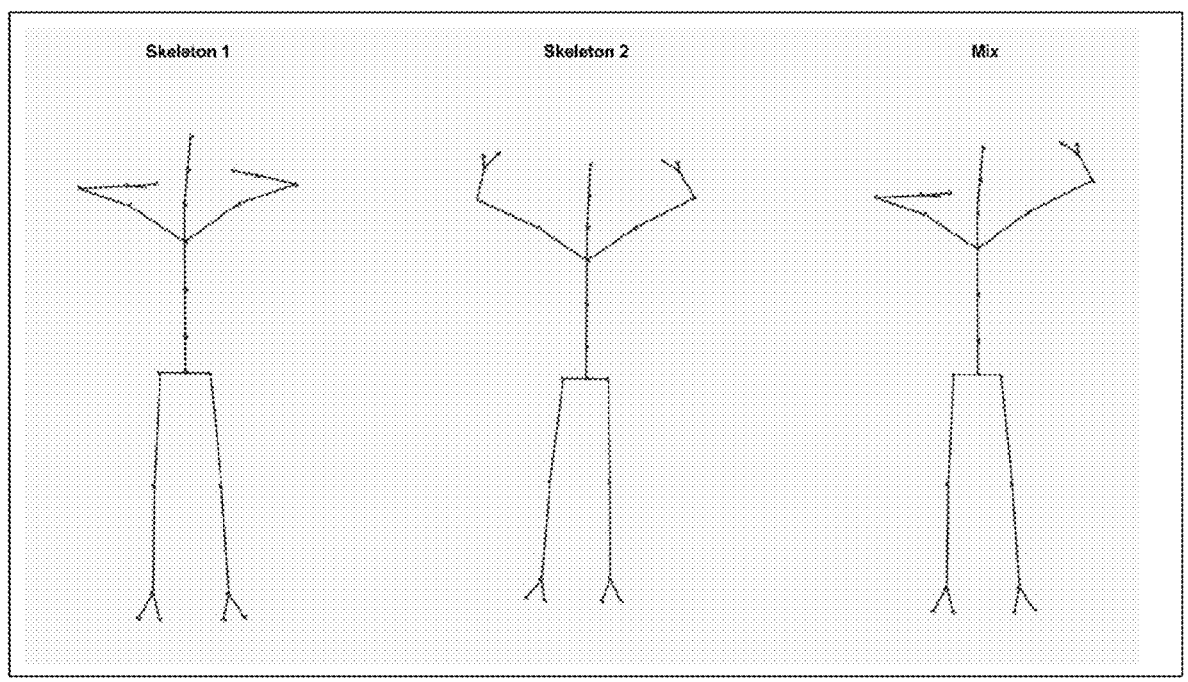
FIG. 10 illustrates the skeleton augmentation process for depth estimator training, in accordance with embodiments of the present disclosure.
Figure 11:
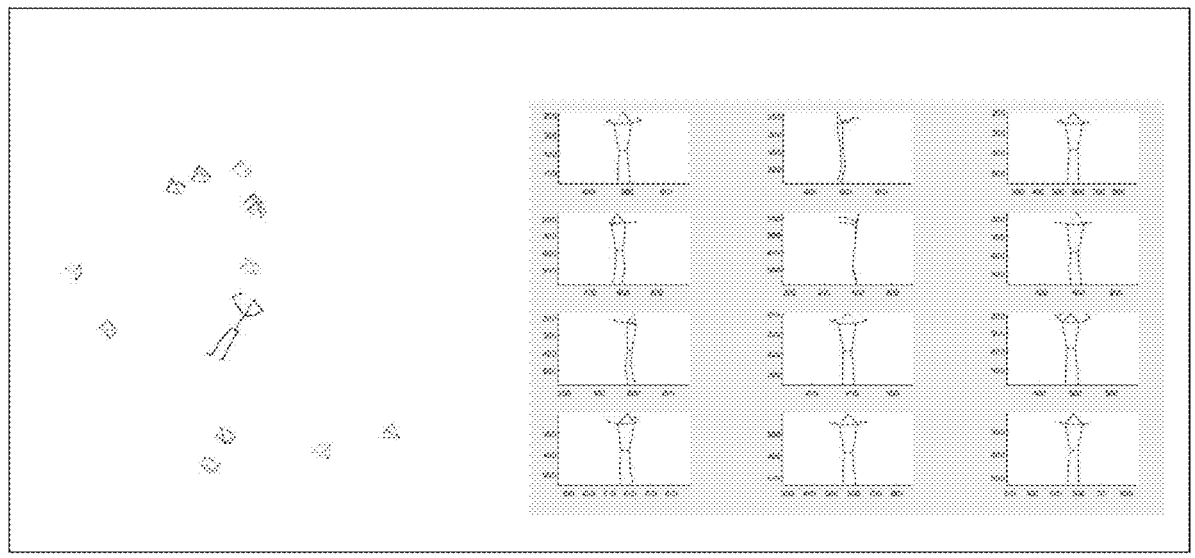
FIG. 11 illustrates the camera augmentation for depth estimator training, in accordance with embodiments of the present disclosure.

Depth Estimation Data 303 consists of many examples of 3D body poses represented as skeletons in a 3D world space. It is important that this set contains examples of as many representative, plausible body poses as possible. Publicly available datasets providing 3D positions of body joints typically lack sufficient variety, and the dataset used in the present disclosure has been created to maximise the coverage of plausible body poses by integrating many sources of 3D body poses. The Depth Estimation Data Augmentation 306 process further increases the number of plausible body poses by combining two poses to create a new novel pose. For each skeleton in the training set one upper body and one lower body joint can be randomly selected to be swapped with the ones of randomly selected skeletons. Upper body joints include Shoulders (left/right) and, Elbow (left/right). Lower body joints include Hips (left/right) and Knees (left/right). Local orientation parameters of the two selected joints (as well as their child joints, e.g., if the left shoulder joint is selected, the left elbow and wrist are also swapped) are swapped with the ones from the randomly selected skeletons to create a new skeleton. This process ensures that the new skeleton has a valid body pose. FIG. 10 illustrates how this process can generate a new pose from two existing skeletons, in which left shoulder and subsequent joints in the skeleton tree from skeleton 1 are swapped with ones from skeleton 2 to create the mixed skeleton In one or more embodiments, the present disclosure uses multi-view augmentation to increase the size of a training dataset. A set of cameras with fixed intrinsic parameters, but at random positions around the subject, can be generated for each skeleton in the dataset. For each skeleton, 12 cameras within a 2 to 6 meters range around the skeleton and an evaluation from 0 to 2 meters high are generated. Cameras are then orientated to point toward the hips of the skeleton, FIG. 11 illustrates this process. Accordingly, the present disclosure can reproject the 3D joints using projective geometry into each cameras image space to obtain the required 2D keypoints.

The projection of 3D keypoints can be provided in an image to produce 2D keypoints in two steps. Initially, the 3D joints can be transformed to be expressed in camera space by applying world to camera affine transform. Thereafter, using camera intrinsic parameters, 3D coordinates can be projected into the camera image plane to produce the associated 2D keypoints.

Figure 12:
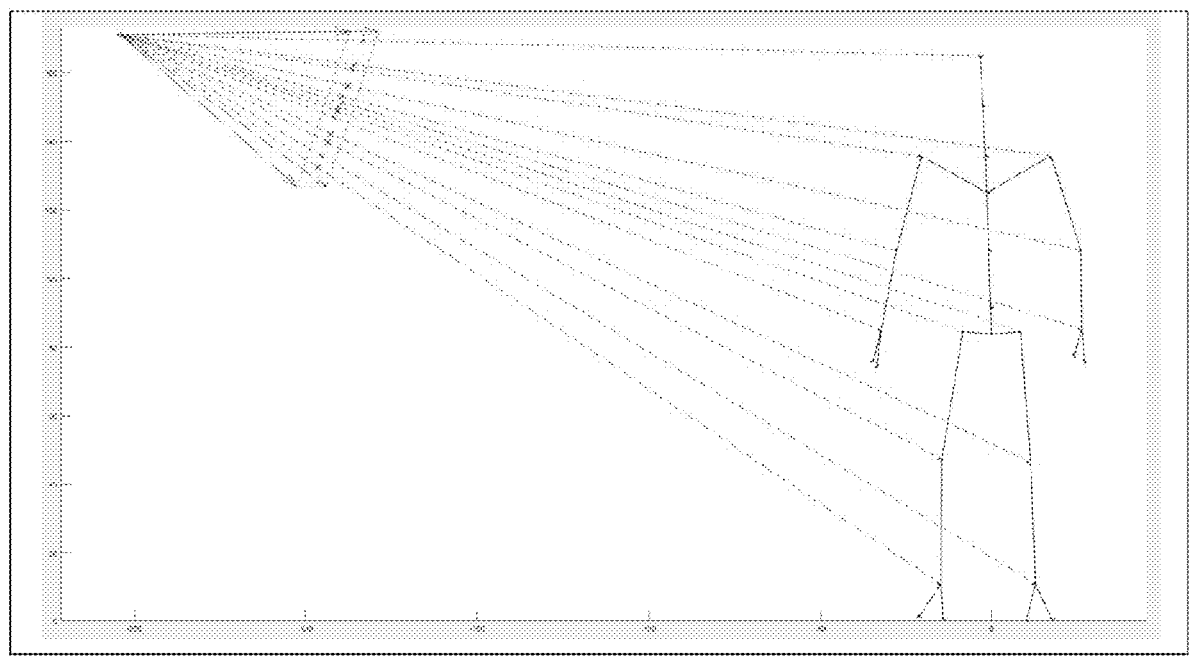
FIG. 12. illustrates the reprojection process, projecting 3D body keypoints into an image to obtain 2D keypoints, in accordance with embodiments of the present disclosure.

FIG. 12 illustrates the reprojection process.

In one or more embodiments, data normalization can be applied to the input 2D body landmarks and output depth as a pre-processing stage. Further, the same normalization process presented in Equation 1 and Equation 2 can be applied to produce 2D landmarks in meters. Normalization can also be applied using Equation 1 and Equation 2 on the 3D joint positions to extract the Z coordinate of each joint to obtain normalized local depth. As used herein, local depth refers, generally, to the depth of a joint with respect to the Hip joint. Thereafter, normalized 2D landmarks can be combined with the normalized local depth to create pairs of training data which are consequently used to train the Depth Estimator 213 model in the Depth Estimator Training 206 process.

Figure 13:
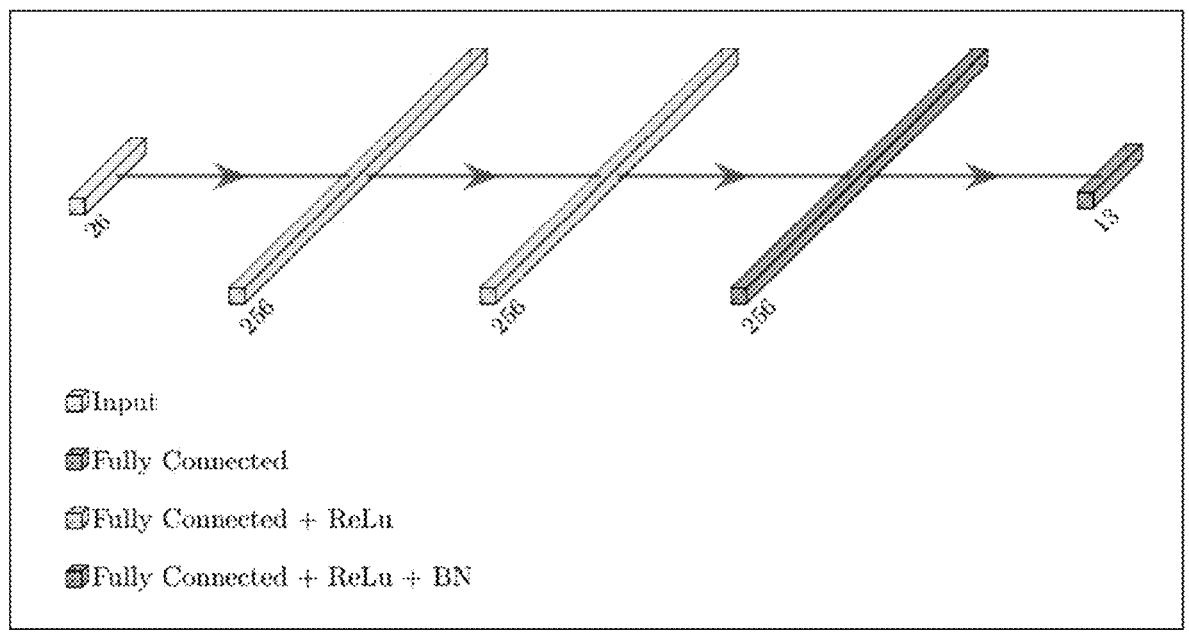
FIG. 13 illustrates the depth estimator network architecture, in accordance with embodiments of the present disclosure.

A preferred embodiment of the Depth Estimator 213 model includes a neural network with an architecture shown in FIG. 13, although other architectures and models are available and can be included without departing from the scope of the present disclosure. In one or more embodiments, the model is trained to learn the relationship between the 2D body features and the depth of each feature. As depicted in FIG. 13, the network architecture comprises a sequential set of linear layers combined with non-linear layers. The 2D body feature set can be flattened from a 2D to 1D vector before input and the depth values returned as a vector with each element containing the depth of the associated body feature. Using normalized 2D landmarks and local depth in the same unit space, rather than denormalized, helps to simplify the relationship between the 2D landmarks input and output depth data, which can reduce the model architecture size. The model can be then trained with the processed Depth Estimator Augmented Data 309 by the Depth Estimator Training 206 process. The systems and methods of performing such a training process are known to a person of ordinary skill in the art.

Real-Time Phase: Image Capture

An overview of the real-time phase is shown in FIG. 4, which includes Detect Keypoints 223, Complete Keypoints 224, Estimate Depth 225 and Skeleton Solving 226 processes all running sequentially in real-time following Image Capture 221, which is described in this section. The Image Capture 221 process produces the Image Frame 222 data which is fed into the rest of the real-time pipe. A preferred embodiment of the present disclosure captures each frame of data from a hardware camera, either integrated with a consumer device, or attached by an interface to the device, at a real-time frame rate of >=30 frames per second. Each frame of capture results in an image. Another preferred embodiment reads sequences of image from a video file stored on a physical device storage at real-time frame rates. Each image is then passed to the Detect Keypoints 223 process.

Real-Time Phase: Detect Keypoints

The aim of the Detect Keypoints 223 process is to output a set of 2D Keypoints 401 describing the locations of each feature of an individual in an image with an associated confidence value for each feature. The input to this process can be the Image Frame 222. The process can use the pre-trained Keypoint Detector 211 model. The input to the model is either with the entire input image resized to the required input dimension of the model as input, or an image patch sampled from image through the procedure described in the Real-Time and Offline Phases: Image Sampling section below. The extent of the image patch can be determined based on the bound box of the detected keypoint locations from the previous frame. The model yields a set of heatmaps, one for each feature to be predicted. Each heatmap is converted to a 2D keypoint. A preferred embodiment of the present disclosure is to find the highest value location in the heatmap and calculate a fast sub-pixel maximum by fitting a 2D polynomial to the 3-by-3 pixel region around this location. The mean value within this region can be used as a confidence value for the feature. Other methods of extracting a keypoint location from a heatmap are possible and are included within the scope of the present disclosure. The predicted keypoint locations are transformed back into image space if required using the bound box and, alongside their confidence values, form 2D Keypoints 401.

Real-Time Phase: Keypoint Completion

The Complete Keypoints 224 process is as follows. Initially, the indices of any erroneous missing keypoints are determined by a threshold applied to the confidence values in the 2D Keypoints 401 data. This forms an occlusion mask array, which can be one of the inputs to the Keypoint Completer 212, as illustrated in FIG. 9. The keypoints are normalized, as described in the Offline Phase: Keypoint Completion Training section. The value of any missing normalized 2D keypoints is set to 0 and then flattened to a 1D vector. This flattened vector, with the occlusion mask array, constitutes the inputs to the Keypoint Completer 212.

The Keypoint Completer 212 model is then run to produce a vector of outputs. The systems and processes or running such a model are known to a person with ordinary skill. The outputs from the Keypoint Completer 212 include a normalized, 1D flattened representation of the completed 2D keypoints. To obtain the final denormalized completed keypoints, the output keypoints can be denormalized, by undergoing the reverse procedure of the normalization, then reshaped into a 2D array, yielding Completed 2D Keypoints 402.

The unnormalization procedure is illustrated by Equation 3 and is the mathematical inverse of the normalization $B_{normalized}=(B-B_{offset})*mPP$ Equation 1. To calculate the un-normalized body features, Bdenormalized, the normalized body features, $B_{normalized}$, are scaled by dividing by mPP, then the offset $B_{offset}$ is added.

$$B_{unnormalized} = \frac{B_{normalized}}{mPP} + B_{offset} \qquad \text{Equation 3}$$

Figures 14A, 14B, 14C:
FIGS. 14A-14C illustrate keypoint completion from an incomplete set of detected body keypoints, in accordance with embodiments of the present disclosure.

An illustration of the Complete Keypoints 224 process is shown in FIG. 14 using synthetically generated missing keypoints. FIG. 14A shows a set of detected 2D keypoints and associated image. FIG. 14B shows the same data on a cropped image with the body features associated with the legs outside the image and therefore missing. The completed set of keypoints is shown in FIG. 14C with the tracking points from FIG. 14A overlaid. The Complete Keypoints 224 process produces plausible locations for the missing keypoints, but in general they will not match the ground truth locations in a synthetic scenario such as this. The completed keypoint are sufficiently plausible to be used as input to the Estimate Depth 225 process.

Real-Time Phase: Estimate Depth

The Estimate Depth 225 process is as follows. The Completed 2D Keypoints, 402, are normalized using the process described in section Offline Phase: Depth Estimation Training. The normalized 2D landmarks are flattened from a 2D to 1D vector and used as input to the Depth Estimator 213 which outputs a normalized depth value for each landmark. Depth unnormalization procedure is applied to the predicted depth using Equation 3, with mPP from the image 2D landmarks. Finally, depth in camera space in meters is obtained by adding mPP*focal_lengh to the denormalized local depth. Combined with the 2D landmarks in camera space to produce the 3D Keypoints 403 in the camera space, which are then fed to the Skeleton Solving process 226.

Real-Time Phase: Skeleton Solving

Figures 15A, 15B:
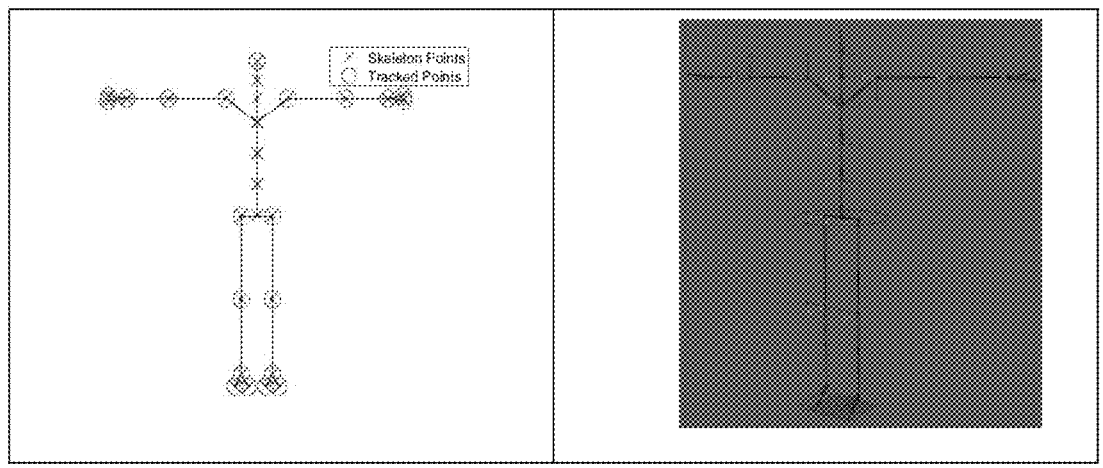
FIG. 15A illustrates the 3D Keypoints 403 and the corresponding mapped skeleton, in accordance with embodiments of the present disclosure.
FIG. 15B shows the joint orient setup in the skeleton, with the x-axis oriented down each limb.
Figure 16:
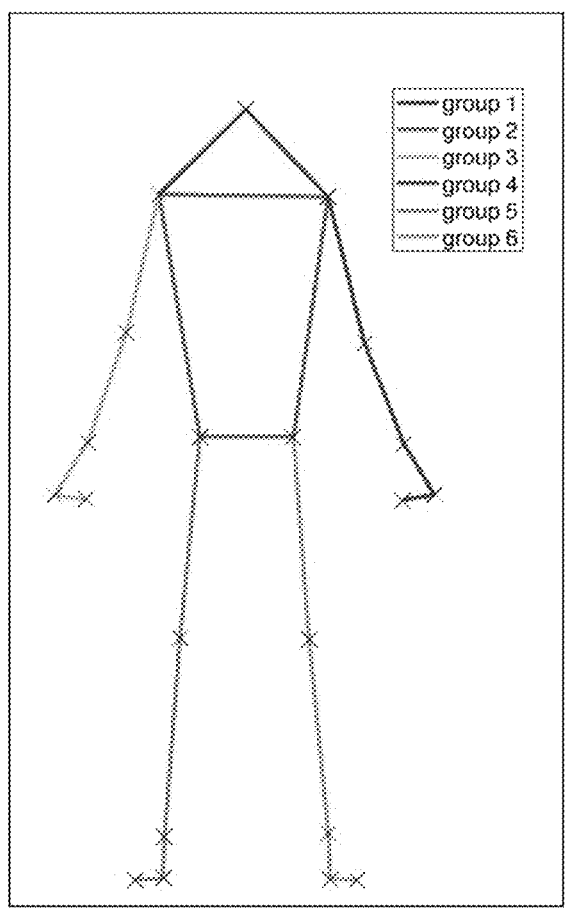
FIG. 16 illustrates groups of joints using during skeleton solving, in accordance with embodiments of the present disclosure.

The Skeleton Solving 226 process is as follows. The 3D Keypoints 403 are fed into Skeleton Solving 226 to obtain a Pose Estimation 227. The Pose Estimation 227 includes a skeleton comprising of a hierarchical set of joints, each with positions and orientations. These positions and rotations are known as the skeleton's parameters. FIG. 15 illustrates a typical skeleton, although other skeleton configurations are envisioned and included in the scope of the present disclosure. Not all of the skeleton joints may directly correspond to the body features represented in the 3D Keypoints 225 data. FIG. 15A shows detected 3D Keypoints that correspond to skeleton joints circled, and skeleton joints with no direct correspondence un-circled. FIG. 15B shows the skeleton structure in 3D space. A weighted combination of the tracker 3D Keypoints is used to obtain a 3D position for skeleton joints with no direct correspondence. For example, although no 3D Keypoint may exist for the hip centre, it can be determined as the average of the hip left and hip right 3D Keypoint positions.

An aim of Skeleton Solving can be to determine a set of skeleton parameters that minimize the root mean square distance between each 3D Keypoint and its corresponding joint in the skeleton.

In one or more embodiments of the present disclosure, local joint orients can be set to ensure the x-axis always points down the limb, as illustrated in FIG. 15B. Limb lengths can be, therefore, determined by a positive translation value in the x-axis. Moreover, skeleton joint rotation limits can be enforced based on realistic human pose characteristics from extreme body positions to ensure implausible poses are impossible. For example, elbow and knee joints have a restricted range of acceptable orientations as they could not plausibly rotate in an unconstrained manner around every axis.

Skeleton Solving 226 can be performed in multiple stages, each of which can be configured to consider a subset of skeleton joints and a subset of the skeleton's parameters. An aim of each stage can be to determine values for the stages subset of skeleton's parameters that minimize the root mean squared distance in camera space between the stage's subset of joints and their corresponding 3D Keypoints. The minimization for each stage is calculated by nonlinear optimization or direct computation where possible, as known in the art. After each stage, computed skeleton parameters can be used in future stages as part of optimization, thereby building up a complete set of skeleton parameters representing a final body pose after completion of the final stage. The following paragraphs detail preferred individual stages and grouping of joints and skeleton parameters per stage. Of course, one of ordinary skill will appreciate that other groupings can be suitable within the scope of the present disclosure.

Figures 17A, 17B, 17C:
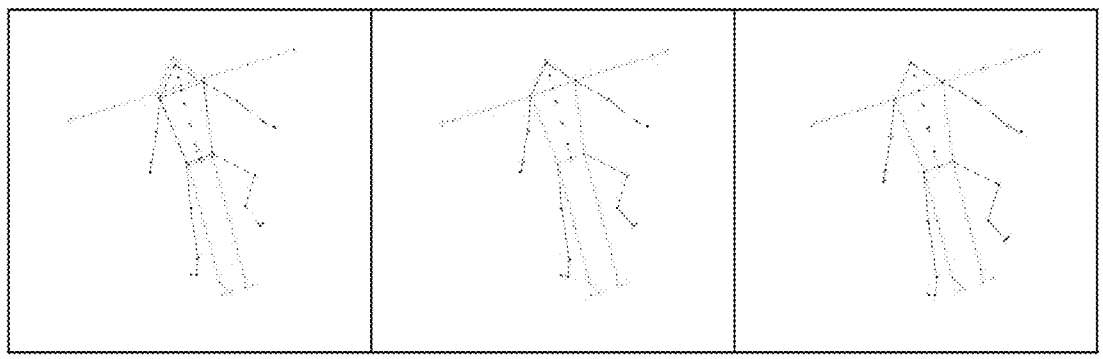
FIG. 17A-17E depict the multistage Skeleton Solve 226 methodology, in accordance with embodiments of the present disclosure. In each stage, the 3D Keypoints 225 are shown in blue and the skeleton in green.

In one or more implementations, a first stage calculates local extrinsic rotations and translations on the hip joint using nonlinear optimization with an objective function. The objective function minimizes the distance between the hip, shoulder, and spine skeleton joints and their corresponding 3D Keypoints. This produces an overall global alignment of the skeleton to the torso keypoint data, such as shown in FIG. 17A.

A second stage calculates local translations on hip and shoulder joints such that they share the same position as their corresponding 3D Keypoints. These local translations can be calculated directly from the difference between the 3D Keypoint and its corresponding joint after the stage one skeleton parameters have been applied. An example of the results of this stage is shown in FIG. 17B.

A third stage determines the limb lengths of the arms, legs, hands, feet, neck and head. Limb lengths can be calculated directly from the 3D Keypoints. For example, the length of the left forearm equals the distance between the 3D Keypoints representing the left shoulder and left elbow. Each joint can be locally oriented such that its local x component always points down the limb, including by setting a joint's local x translation to the computed limb length, which can ensure the skeleton's limb lengths are accurately reflect those calculated from the 3D Keypoints. FIG. 17C illustrates this process of setting the skeleton limb lengths.

Figures 17D, 17E:
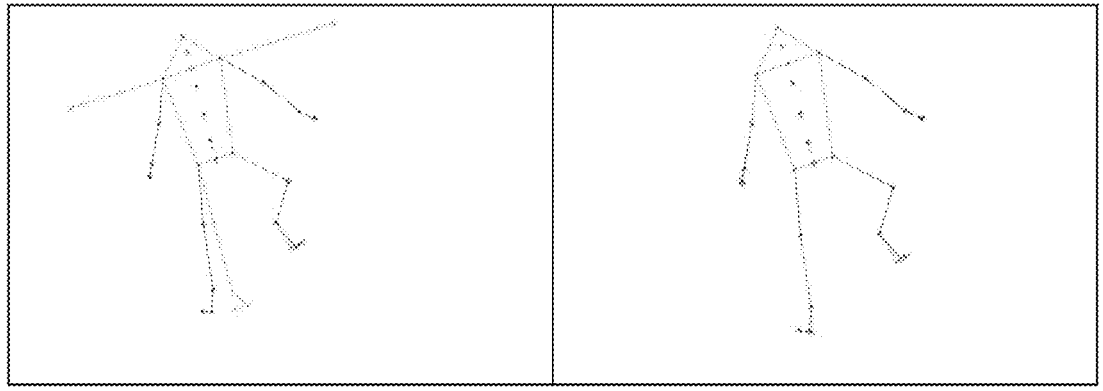

A fourth and final stage uses nonlinear optimization to fit each limb to its respective 3D Keypoints. For example, the skeleton's left arm is fit by optimizing the left shoulder, left elbow and left wrist joint rotations, such that the distance between those joints and their associated 3D Keypoints is minimized FIG. 17D illustrates the Skeleton Solving 226 after the head and the left leg groups have been optimized and FIG. 17E illustrates the completed fitting. The skeleton parameters of all stages of Skeleton Solving 226 produce the final Pose Estimation 227 output.

Figures 18A, 18B, 18C:
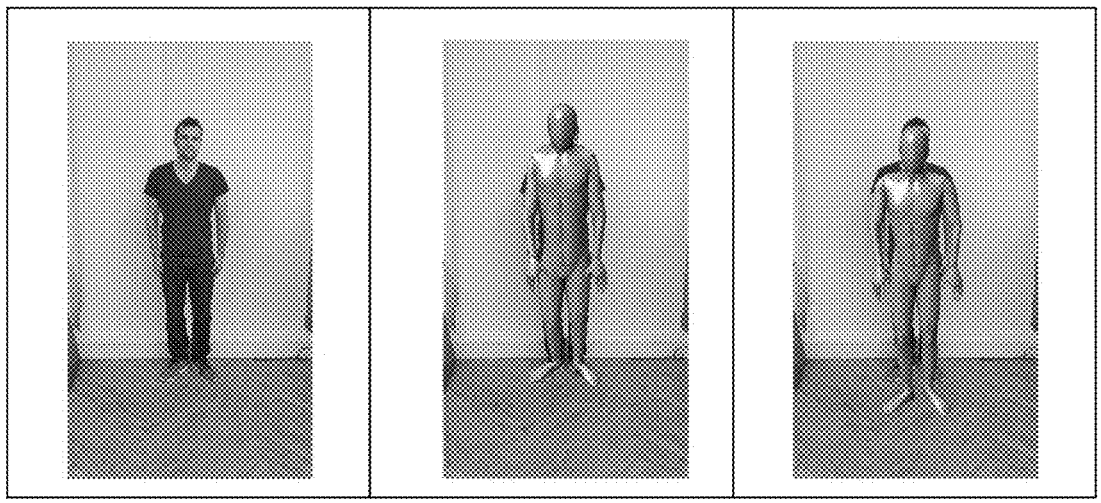
FIG. 18A shows an original image.
FIG. 18B illustrates an exact projection Skeleton Solve.
FIG. 18C an orientation-only Skeleton Solve.

Embodiments of this disclosure can provide an orientation-only, an exact projection Pose Estimation 227, or both, depending upon the target application. The orientation-only pose estimation can be suitable for character animation, as limb length remain constant while the exact projection pose estimation can be better suited for augmented reality applications, where it is more suitable that an augmented graphical filter overlays exactly with the person in the image. The exact projection mode is described above and depicted in FIGS. 17A-E, and the orientation-only mode is derived by extracting only the joint orientations from Skeleton Solving 226 and omitting the translation components. FIG. 18-B illustrates an exact projection and FIG. 18-C an orientation-only Skeleton Solve applied to a digital character. FIG. 18-A shows the original image.

Real-Time and Offline Phases: Image Sampling

Figures 19A, 19B, 19C:
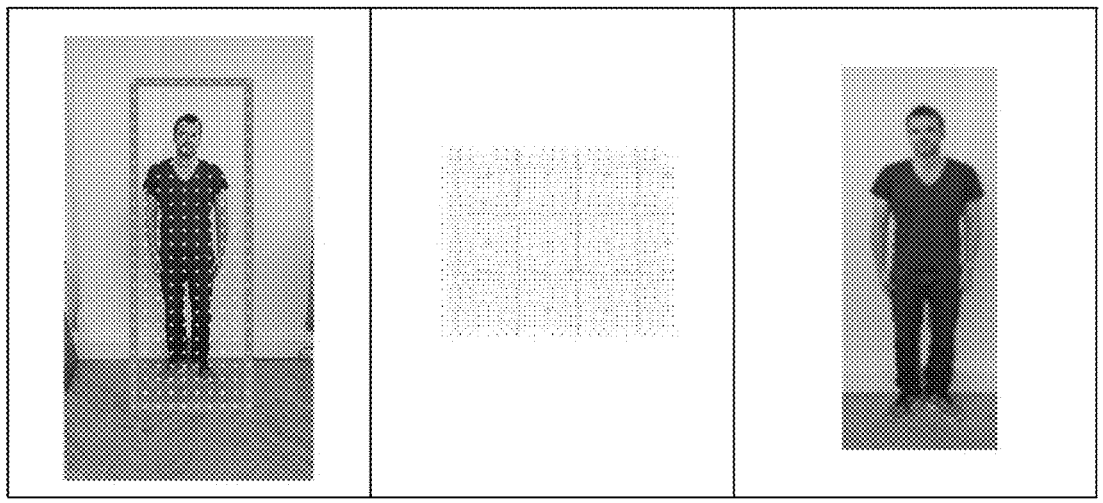
FIG. 19A-19C illustrate image sampling in accordance with embodiments of the present disclosure, where

The embodiments of the present disclosure are both robust and efficient. Body pose estimation can work independently, for example, of the resolution of the Image Frame 222 or the size of the Subject 102 in the image. In addition, the present disclosure can be capable of running on Computer 101 at real-time frame rates. More particularly, the Keypoint Detector Training 204 and Detect Keypoints processes 223 of the present disclosure utilize the extraction of a fixed-size image patch. To create such an image patch, intensity values for each channel of the original image frame can be sampled from a grid of locations. FIG. 19A shows a visualisation of the extent of a desired image patch, represented as a green box along with a set of yellow crosses, which shows the location of the image samples used to form an image patch at the required resolution. In one or more implementations, the grid does not align with pixel centers of the original image without some form of interpolation. In addition, sampling frequency of the grid may not match the sampling frequency of the original image. In the example shown in FIG. 19B, a sampling grid is misaligned with the original image pixel samples. For example, the red crosses of FIG. 19B depict sampling centers, the red boxes represent the desired scale of the sampled pixels, the black dots show the image pixel centers, and the black boxes show the scale of the image pixels.

One of ordinary skill will recognize that a conventional method addressing a misalignment problem is to bilinearly interpolate the original image at each grid location. However, this approach may result in samples becoming increasingly noisy as the sampling frequency of the grid decreases with regard to the original image. This can introduce a scale dependency to the image patches. A second known method avoids this scale dependency by cropping the image patch from the bound box of the grid sample locations at the original image sampling rate and, thereafter, resizing the cropped patch to the desired resolution using standard image resizing methods. However, this method increases computational demands as the image resolution increases, thereby potentially decreasing runtime performance below real-time. Further, this method can introduce a resolution dependency on runtime performance in accordance with the present disclosure. Accordingly, one or more embodiments of the present disclosure uses an efficient and scale-independent method of computing an intensity value for each image channel at each grid location, based on Integral Images. Integral images can be used, for example, to compute an average pixel value within a rectangular image area at fixed computation demands, regardless of the resolution of the input image. Methods to achieve scale-independent sampling using integral images are known. The computation of the integral image for each frame has resolution-dependent computational cost. However, efficient processing methods can be employed, such as by using integral images for a sampling method to compute scale-independent image samples and retain real-time computational cost. FIG. 19C shows an example of an image patch generated by applying scale-independent integral image sampling at given sampling points.

What is claimed:

1. A computer-implemented method for tracking body features of a subject and producing a pose estimation using an unconstrained video sequence at computational speeds approximating real time, the video sequence constituting a physical record of the body features of the subject, the method comprising:
   receiving, by at least one computing device from a first neural network, a set of 2D coordinates corresponding to the body features of the subject, wherein the first neural network is trained to use an entire image or image region as input and to return a respective set of 2D coordinates;
   detecting, by the at least one computing device using the received set of 2D coordinates, 2D Keypoints corresponding to the body features of the subject;
   transmitting, by the at least one computing device, to a second neural network, the detected 2D Keypoints, wherein the second neural network is trained to use the detected 2D Keypoints as input and to return corresponding depth estimation values;
   receiving, by the at least one computing device from the second neural network, the depth estimation values corresponding to the transmitted 2D Keypoints;
   processing, by the at least one computing device, the received depth estimation values to generate a set of 3D coordinates that correspond to the body features of the subject in camera space;
   applying, by the at least one computing device, one or more non-linear optimizations to fit a predetermined skeleton to the generated 3D coordinates; and
   producing, by the at least one computing device, the pose estimation corresponding to the body features of the subject.

2. The computer-implemented method of claim 1, wherein the 2D Keypoints are missing data, and further comprising:
   receiving, by the at least one computing device from the second neural network in response to the transmitted detected 2D Keypoints, a completed set of 2D Keypoints.

3. The computer-implemented method of claim 1, wherein the first or second neural network is trained with images augmented with different backgrounds.

4. The computer-implemented method of claim 1, wherein the first or second neural network is trained with images augmented with motion blur.

5. The computer-implemented method of claim 1, wherein the first or second neural network uses scale-independent images produced from integral images for training and inference.

6. The computer-implemented method of claim 1, wherein the first or second neural network uses scale-independent images produced by a pyramid of images for training and inference.

7. The computer-implemented method of claim 1, further comprising:
   utilizing, by the at least one computing device in the detecting process, an image-region obtained from a bounding box enclosing the 2D Keypoints detected in a previous frame.

8. The computer-implemented method of claim 1, further comprising:
   normalizing, by the at least one computing device, the detected 2D Keypoints prior to transmitting the detected 2D Keypoints to the first neural network.

9. The computer-implemented method of claim 1, further comprising:
   normalizing, by the at least one computing device, the received depth estimation values prior to generating the 3D coordinates.

10. The computer-implemented method of claim 1, wherein the first neural network is a convolutional neural network.

11. A computer-implemented system for tracking body features of a subject and producing a pose estimation using an unconstrained video sequence at computational speeds approximating real time, the video sequence constituting a physical record of the body features of the subject, the system comprising:
    at least one computing device, configured by executing instructions stored on non-transitory processor readable media to:
    receive, from a first neural network, a set of 2D coordinates corresponding to the body features of the subject, wherein the first neural network is trained to use an entire image or image region as input and to return a respective set of 2D coordinates;
    detect, using the received set of 2D coordinates, 2D Keypoints corresponding to the body features of the subject;
    transmit, to a second neural network, the detected 2D Keypoints, wherein the second neural network is trained to use the detected 2D Keypoints as input and to return corresponding depth estimation values;
    receive, from the second neural network, the depth estimation values corresponding to the transmitted 2D Keypoints;
    process the received depth estimation values to generate a set of 3D coordinates that correspond to the body features of the subject in camera space;
    apply one or more non-linear optimizations to fit a predetermined skeleton to the generated 3D coordinates; and
    produce the pose estimation corresponding to the body features of the subject.

12. The computer-implemented system of claim 11, wherein the 2D Keypoints are missing data, and further wherein the at least one computing device is configured by executing instructions stored on non-transitory processor readable media to:

receive, from the second neural network in response to the transmitted detected 2D Keypoints, a completed set of 2D Keypoints.

13. The computer-implemented system of claim 11, wherein the first or second neural network is trained with images augmented with different backgrounds.

14. The computer-implemented system of claim 11, wherein the first or second neural network is trained with images augmented with motion blur.

15. The computer-implemented system of claim 11, wherein the first or second neural network uses scale-independent images produced from integral images for training and inference.

16. The computer-implemented system of claim 11, wherein the first or second neural network uses scale-independent images produced by a pyramid of images for training and inference.

17. The computer-implemented system of claim 11, wherein the at least one computing device is further configured by executing instructions stored on non-transitory processor readable media to:

utilize, in the detecting process, an image-region obtained from a bounding box enclosing the 2D Keypoints detected in a previous frame.

18. The computer-implemented system of claim 11, wherein the at least one computing device is further configured by executing instructions stored on non-transitory processor readable media to:

normalize the detected 2D Keypoints prior to transmitting the detected 2D Keypoints to the first neural network.

19. The computer-implemented system of claim 11, wherein the at least one computing device is further configured by executing instructions stored on non-transitory processor readable media to:

normalize the received depth estimation values prior to generating the 3D coordinates.

20. The computer-implemented system of claim 11, wherein the first neural network is a convolutional neural network.

* * * * *